United States Patent [19]
Delgado et al.

[11] Patent Number: 6,060,159
[45] Date of Patent: May 9, 2000

[54] THERMOMORPHIC "SMART" PRESSURE SENSITIVE ADHESIVES

[76] Inventors: Joaquin Delgado; Spencer F. Silver, both of P.O. Box 33427, St. Paul, Minn. 55133-3427

[21] Appl. No.: 09/255,620

[22] Filed: Feb. 22, 1999

Related U.S. Application Data

[62] Division of application No. 08/660,219, Jun. 3, 1996, Pat. No. 5,889,118.

[51] Int. Cl.[7] .................................................. C09J 7/02
[52] U.S. Cl. .............................. 428/343; 428/355 AC; 428/355 BL
[58] Field of Search ........................... 428/343, 355 AC, 428/355 BL

[56] References Cited

U.S. PATENT DOCUMENTS

| | | | |
|---|---|---|---|
| 3,222,419 | 12/1965 | Jubilee et al. | 525/228 |
| 3,301,741 | 1/1967 | Henrickson et al. | 428/41.5 |
| 3,345,434 | 10/1967 | Griffith | 525/228 |
| 3,502,604 | 3/1970 | Nakatsuka et al. | 525/228 |
| 3,635,754 | 1/1972 | Beede | 428/86 |
| 3,691,140 | 9/1972 | Silver | 526/243 |
| 3,707,518 | 12/1972 | Bemmels et al. | 526/79 |
| 3,833,689 | 9/1974 | Usamoto et al. | 525/218 |
| 3,900,674 | 8/1975 | Coffman | 428/355 AC |
| 3,983,297 | 9/1976 | Ono et al. | 428/355 AC |
| 4,112,023 | 9/1978 | Gore et al. | 525/228 |
| 4,127,545 | 11/1978 | Callan et al. | 525/222 |
| 4,166,152 | 8/1979 | Baker et al. | 528/522 |
| 4,232,132 | 11/1980 | Grigo et al. | 525/222 |
| 4,302,376 | 11/1981 | Walkowiak et al. | 525/228 |
| 4,308,190 | 12/1981 | Walkowiak et al. | 525/228 |
| 4,540,739 | 9/1985 | Midgley | 524/764 |
| 4,554,324 | 11/1985 | Husman et al. | 525/301 |
| 4,587,152 | 5/1986 | Gleichenhaen et al. | 428/195 |
| 4,616,057 | 10/1986 | Lindemann et al. | 524/458 |
| 4,710,544 | 12/1987 | Wolfe, Jr. | 525/227 |
| 4,735,837 | 4/1988 | Miyasaka et al. | 428/40 |
| 4,782,110 | 11/1988 | Wolfe, Jr. | 525/227 |
| 4,786,696 | 11/1988 | Bohnel | 526/88 |
| 4,889,234 | 12/1989 | Sorensen et al. | 206/459 |
| 4,968,562 | 11/1990 | Delgado | 428/402 |
| 4,983,656 | 1/1991 | Ito et al. | 524/109 |
| 5,045,569 | 9/1991 | Delgado | 521/60 |
| 5,091,483 | 2/1992 | Mazurek et al. | 525/477 |
| 5,100,963 | 3/1992 | Lin | 525/228 |
| 5,139,832 | 8/1992 | Hayashi et al. | 428/35.5 |
| 5,156,911 | 10/1992 | Stewart | 428/355 AC |
| 5,296,277 | 3/1994 | Wilson et al. | 428/40 |
| 5,387,450 | 2/1995 | Stewart | 428/40.4 |
| 5,412,035 | 5/1995 | Schmitt et al. | 525/236 |
| 5,508,313 | 4/1996 | Delgado et al. | 521/63 |
| 5,888,650 | 3/1999 | Calhoun et al. | 428/355 AC |

FOREIGN PATENT DOCUMENTS

| | | | |
|---|---|---|---|
| 87344 | 8/1983 | European Pat. Off. | 525/227 |
| 0242874 | 10/1987 | European Pat. Off. | C08L 101/00 |
| 279579 A1 | 8/1988 | European Pat. Off. | C09J 7/02 |
| 279579 B1 | 8/1988 | European Pat. Off. | C09J 7/04 |
| 45269 | 8/1984 | Japan . | |
| 2256815A | 12/1992 | United Kingdom | A61L 15/16 |
| WO 83/04602 | 10/1985 | WIPO | D05D 5/10 |
| WO 90/13420 | 11/1990 | WIPO | B32B 7/12 |
| WO 91/14462 | 10/1991 | WIPO | A61L 15/06 |
| WO 91/18739 | 12/1991 | WIPO | B32B 7/12 |
| WO 92/13901 | 8/1992 | WIPO | C08F 8/00 |
| 93/13147 | 7/1993 | WIPO | C08F 220/18 |
| WO 93/13148 | 7/1993 | WIPO | C08F 220/18 |
| WO 94/24219 | 10/1994 | WIPO . | |
| WO 95/11945 | 5/1995 | WIPO | C09J 7/02 |
| WO 96/01281 | 1/1996 | WIPO | C08F 18/10 |

OTHER PUBLICATIONS

R. Dagani, "Polymeric 'Smart' Materials Respond to Changes in their Environment," *C&EN*, 30–33 (Sep. 18, 1995).

Plate' & Shibaev, "Comb–like Polymers, Structure and Properties," *J. Polymer Science—Macromolecular Reviews*, 8, 117–253 (1974).

*Primary Examiner*—Peter A. Szekely

[57] ABSTRACT

A thermomorphic pressure sensitive adhesive is provided. The adhesive includes a continuous crystalline polymer component and a discrete crosslinked elastomeric polymer component. The pressure sensitive adhesive has at least one distinct crystalline melting point and is capable of transitioning between a secondary shape and a primary shape upon an increase in temperature.

7 Claims, 7 Drawing Sheets

THERMOMORPHIC "SMART" PRESSURE SENSITIVE ADHESIVES

This is a division of application No. 08/660,219 filed Jun. 3, 1996, now U.S. Pat. No. 5,889,118.

BACKGROUND OF THE INVENTION

"Smart" materials include shape memory alloys, piezoelectric ceramics, polymer gels, and electrorheological fluids. These materials respond in some desired way to a change in temperature, pH, moisture, electric or magnetic fields, or some other factor. For example, polymer gels change size and shape in response to a stimulus and thereby convert chemical energy into mechanical energy. Colloidal suspensions change from a free-flowing liquid to a gel in response to electric or magnetic fields. Elastomeric composites change modulus (i.e., resistance to deformation) by applying a magnetic field. That is, molded elastomeric matrices having magnetic particles embedded therein increase in resistance to deformation when subjected to compressive or shear forces. Such elastomeric composites could be used to isolate or absorb vibrations.

New materials that respond intelligently to changes in temperature or moisture have also been developed. For example, polyethylene glycols bonded to various fibrous materials such as cotton and polyester possess the intelligent properties of thermal adaptability and reversible shrinkage. Thermal adaptability involves imparting a "thermal memory" to a material such that when the temperature rises, the material cools off, whereas when the temperature drops, the material warms up. Such thermally adaptable materials could be used for biomedical products for body-temperature regulation and burn therapy. Reversible shrinkage involves imparting a "dimensional memory" to the material such that when the material is exposed to a liquid (e.g., water) it shrinks in area. Such materials could be used for pressure bandages that contract when exposed to blood, for example, thereby putting pressure on a wound.

Polymers and polymer surfaces have been modified to change their characteristics in response to external stimuli, such as pH. Such responsive surfaces could be important for imparting adhesion, printability, coatability, and biocompatibility to plastics. Memory shape polymers have been widely used in the packaging industry. Most of these materials are crosslinked semicrystalline materials that when heated shrink or deform from a metastable state to a stable one.

Thus, although "smart" materials are constantly being developed to make materials more responsive to external stimuli, more and more such materials are needed for a wide variety of applications. One such material that would be useful would be a "smart" pressure sensitive adhesive (PSA). PSAs having a nonplanar or structured surface are known, however, the structure created, either by coating particles or by microreplication techniques, remains through the life of the PSA without predetermined changes. Thus, it would be desirable to have a PSA with the ability to change shapes (e.g., surface structure) on demand with an increase in temperature to increase their breadth of applications. A PSA with these characteristics could be called a thermomorphic PSA, the shape or structure of which could be changed on demand.

SUMMARY OF THE INVENTION

The present invention provides a thermomorphic pressure sensitive adhesive that includes a continuous crystalline polymer component and a discrete crosslinked elastomeric polymer component. The pressure sensitive adhesive has at least one distinct crystalline melting point and is capable of transitioning in a predetermined way between a secondary shape and a primary shape upon an increase in temperature.

Specifically, the present invention provides a thermomorphic pressure sensitive adhesive comprising:

(a) a continuous crystalline polymer component; and (b) a discrete crosslinked elastomeric polymer component;

wherein the pressure sensitive adhesive has at least one distinct crystalline melting point and is capable of transitioning between a secondary shape and a primary predetermined shape upon an increase in temperature.

Another embodiment of the invention is a thermomorphic pressure sensitive adhesive comprising:

(a) a continuous crosslinked crystalline polymer component comprising a poly(n-octadecyl acrylate), poly(behenyl acrylate), and mixtures thereof; and (b) a discrete crosslinked elastomeric polymer component comprising a poly(acrylate);

wherein the pressure sensitive adhesive has at least one distinct crystalline melting point and is capable of transitioning between a secondary shape and a primary predetermined shape upon an increase in temperature.

Also provided is a thermomorphic pressure sensitive adhesive article comprising a backing on which is coated a layer of a thermomorphic pressure sensitive adhesive comprising:

(a) a continuous crystalline polymer component; and (b) a discrete crosslinked elastomeric polymer component;

wherein the pressure sensitive adhesive has at least one distinct crystalline melting point and is capable of transitioning between a secondary topography and a primary predetermined topography upon an increase in temperature.

Another embodiment of the present invention is a method of changing the shape of a pressure sensitive adhesive comprising:

(a) providing a thermomorphic pressure sensitive adhesive comprising:

(i) a continuous crystalline polymer component; and (ii) a discrete crosslinked elastomeric polymer component;

wherein the pressure sensitive adhesive has at least one distinct crystalline melting point and is capable of transitioning between a secondary shape and a primary predetermined shape upon an increase in temperature; and (b) increasing the temperature of the thermomorphic pressure sensitive adhesive while in its secondary shape to form its primary predetermined shape.

DETAILED DESCRIPTION OF THE INVENTION

The present invention provides a thermomorphic pressure sensitive adhesive (PSA). A thermomorphic PSA is one that changes its shape (e.g., surface topography) in a predetermined way in response to a change in temperature. Thus, a thermomorphic PSA is one that has a primary shape imparted thereto, which can be converted to a secondary shape that is maintained until its temperature is raised above a certain threshold temperature, and is capable of transitioning between the secondary shape and the primary shape with an increase in temperature. For example, the shape of a three-dimensional object, such as a particle, can change or the surface topography (i.e., macroscopic surface features) of a film can change in a predetermined way upon the application of heat or upon irradiation, e.g., in the form of ultraviolet, infrared, microwave, or radio frequency radiation. Thus, as used herein, a "change in shape" includes both situations.

The shapes of the thermomorphic PSA materials of the present invention can vary. The shape can be in the overall form of the material, such as a spherical particle (i.e., microsphere), or in the surface features (i.e., topography) of the material. Examples of surface feature shapes include, but are not limited to, hemispheres, prisms such as square prisms, rectangular prisms, cylindrical prisms, and other similar polygonal features, pyramids such as cube corners and tetrahedra, ellipses, and grooves. Positive or negative features can be used, such as convex or concave hemispheres. Truncated features can also be used. These surface features can be in ordered or random and irregular arrays.

Thermomorphic pressure sensitive adhesive articles include a layer of the PSA on a carrier or a support material such as a backing or release liner. They can be used anywhere pressure sensitive adhesives are conventionally used, such as in joining, masking, mending, protecting, mounting, labeling and other commonly known applications. If a release liner is used, the article is a transfer tape. Due to the novel thermomorphic behavior of these compositions, however, the PSAs of the present invention are particularly useful in applications which advantageously exploit the differential topographical capabilities present in these adhesives.

Thus, thermomorphic PSAs can be used in manufacturing articles that require on-demand differentiable PSA properties during their life cycle. Examples of such applications include articles used in graphics, medical, and label constructions. For example, one of the inherent problems with traditional labels and adhesive-coated graphics is the difficulty in cleanly removing such articles from surfaces. In response to this problem, thermomorphic labels or graphic articles can be prepared using the formulations of the present invention that have a planar secondary shape and a structured primary topography. Such thermomorphic articles would have a high bond strength and stable level of adhesion of the secondary shape to a surface due to their continuous area of contact to that surface until the temperature is increased. Upon an increase in temperature, the structured primary shape of the adhesive appears, reducing the contact area of the adhesive to the surface and allowing for easier removal of these articles.

Thermomorphic PSA articles used to deliver compositions to a surface can also be prepared. Examples of such articles have recessed secondary cavities and planar primary topographies. Pigments, inks, pharmaceuticals or other compounds are placed in these cavities and the resultant article adhered to a surface. When the temperature of the PSA is increased, the secondary topography changes to the primary topography. As a result, the cavities disappear and bring the materials placed therein into direct contact with the surface to which the article is adhered.

Additionally, positionable PSA articles can be made having a structured secondary topography and a planar primary topography. When the structured secondary topography is properly configured, such positionable articles can be placed against a substrate surface and easily slid over the surface without pre-adhering to the substrate. Once positioned, the thermomorphic adhesive surface's structured secondary topography can be transformed to the planar primary topography, thereby forming a permanent, continuous bond by heating the article.

The thermomorphic PSAs of the present invention include a continuous crystalline polymer component and a discrete crosslinked elastomeric polymer component, which may or may not be continuous. As used herein, "discrete" polymer components mean that the crystalline polymer component is discernible from the elastomeric polymer component by a variety of techniques, such as optical microscopy. That is, the PSA has a continuous phase of a crystalline component that is separate and distinct from an elastomeric component. As used herein a "continuous" polymer component is one that is substantially uninterrupted throughout the sample such that the thermomorphic behavior of the PSA is maintained. The crystalline polymer component imparts at least one distinct crystalline melting point to the pressure sensitive adhesive.

The elastomeric polymer component includes a crosslinked pressure sensitive adhesive. It imparts the pressure sensitive adhesive properties and the elastic recovery force necessary to attain the primary shape of the thermomorphic PSA. The pressure sensitive adhesive compositions that can be used in the elastomeric component are those that are typically suitable for use in adhesive tapes. Such materials possess a four-fold balance of adhesion, cohesion, stretchiness, and elasticity, and a glass transition temperature (Tg) of less than about 20° C. Thus, the pressure sensitive adhesive compositions forming the elastomeric component are tacky to the touch at room temperature (e.g., about 20–25° C.), as can be readily determined by a finger tack test or by conventional measurement devices, and can easily form a useful adhesive bond with the application of light pressure.

Figure 7:
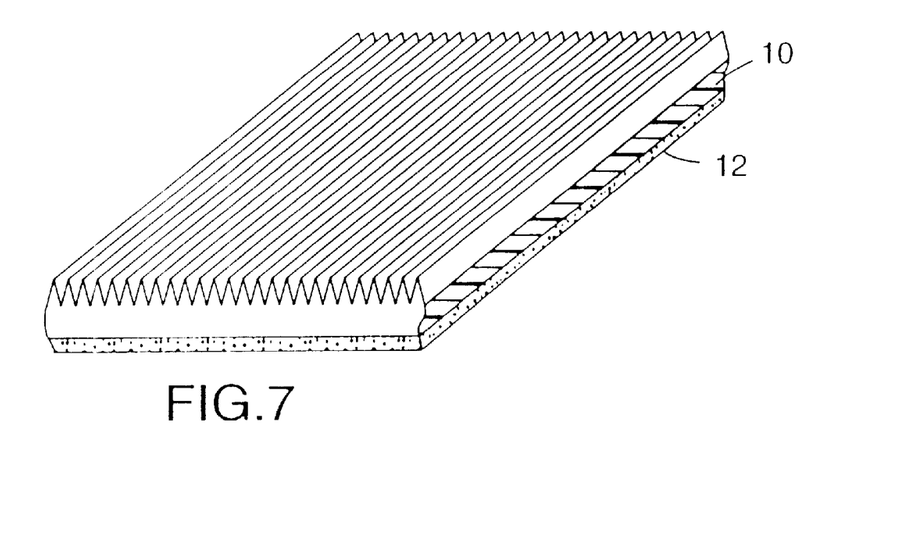
FIG. 7 is a schematic of the cross-section of a thermomorphic pressure sensitive adhesive coated on a backing shown in its primary shape.
Figure 8:
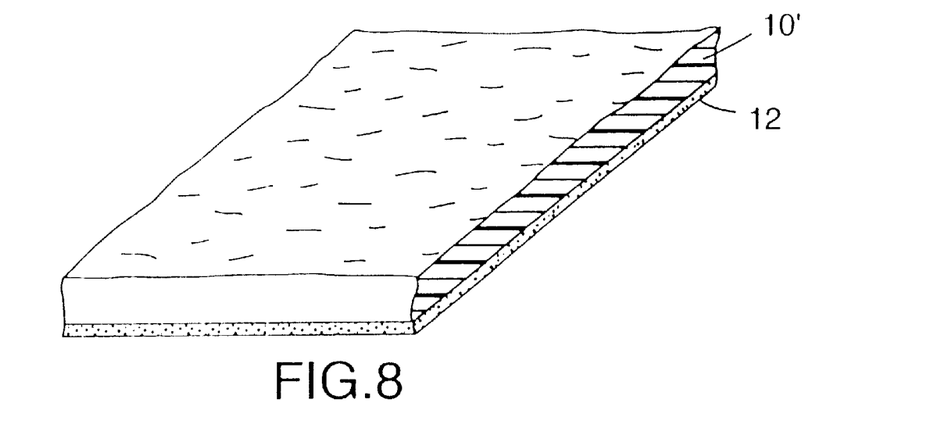
FIG. 8 is a schematic of the cross-section of the thermomorphic pressure sensitive adhesive of FIG. 7 coated on a backing shown in its secondary shape.

The crystalline polymer component includes a crystalline material that typically is soluble in organic solvents or in the monomers that form the elastomeric component. It imparts the lock-in mechanism necessary to stabilize the secondary shape. This can be better understood by referring to the process by which the thermomorphic PSAs of the present invention are made and function, and to the schematic shown in FIGS. 7 and 8. Initially, the PSA is synthesized with a given shape (e.g., surface topography), as represented by the cross-sectional view of a layer of a thermomorphic PSA 10 on a backing 12 shown in FIG. 7. The crosslinked elastomeric polymer component supports this primary shape. At a temperature above the melting temperature ($T_m$) of the crystalline polymer component, a secondary shape is given to the PSA, as represented by the cross-sectional view of the layer of thermomorphic PSA 10' on backing 12 shown in FIG. 8. While forcing the PSA to have this shape (by pressure, for example), the PSA is cooled to a temperature below the $T_m$ of the crystalline polymer component, thereby reforming the crystalline structure and locking in the secondary shape. This secondary shape will be maintained as long as the temperature is kept below the $T_m$ of the crystalline polymer component. When the temperature of the PSA is increased above the $T_m$, the crystalline structure melts and the elastic recovery forces of the elastomeric polymer component cause the PSA to revert to its primary shape, as represented by the cross-sectional view of the layer of thermomorphic PSA 10 shown in FIG. 7.

The rate of recovery and the fidelity of the recovered primary. shape are directly related to the crosslinking density of the elastomeric polymer component. The crosslinking density determines the "memory" of the PSA, or the speed of recovery of the primary shape and fidelity of the primary shape, whereas the crystalline component and its morphology determine the degree to which the secondary shape is maintained. Generally, the higher the degree of crosslinking, the faster the rate of recovery of the primary shape and the higher the fidelity (i.e., the degree to which the heated thermomorphic adhesive faithfully replicates the primary shape as originally imparted) of the recovered shape. The degree of crosslinking of the elastomeric component is generally sufficient to provide recovery of the primary shape, yet must also allow the component to retain the four-fold balance of PSA properties.

An optimum balance thus exists between the amount of elastic recovery force stored in the deformed elastomeric polymer component and the amount of crystallinity needed to retain the secondary shape of the PSA. The crystalline component is typically present in a sufficient amount to provide a thermomorphic adhesive possessing a morphology in which the crystalline component is continuous and supports the secondary shape until transition to the primary shape is desired. Therefore, the crosslinking density of the elastomeric polymer component and the degree of crystallinity determine the overall thermomorphic response of the PSA.

The thermomorphic pressure sensitive adhesives of the present invention demonstrate two general morphologies depending on the amount and structure of the crystalline polymer component present in these materials. The morphology of these compositions can be observed by optical or electron microscopy. When optical microscopy is used, the crystalline polymer component is easily identified by the appearance of birefringence when viewed between crosspolarizers. Both morphologies are characterized by the presence of a continuous crystalline polymer component and a distinct elastomeric polymer component that is readily discernible from the crystalline polymer component.

For example, for side-chain crystalline polyacrylates, such as poly(octadecyl acrylate), these morphologies are obtained when there is at least about 3 percent by weight (wt-%) of the crystalline polymer component present, based on the total weight of the crystalline and elastomeric components of the thermomorphic PSA. One of the morphologies includes both a continuous crystalline polymer component and a continuous elastomeric polymer component. This is referred to herein as a "co-continuous" (CC) morphology. See, for example, FIGS. 5 and 6. In this morphology, the crystalline polymer component may contain within it dispersed domains of the elastomeric polymer component, and the elastomeric polymer component may contain within it dispersed domains of the crystalline polymer component, as long as the majority of the crystalline polymer component and elastomeric polymer component are continuous. Similarly, for these acrylates, the CC morphology includes less than about 5 wt-% crystalline polymer component. The other morphology includes a continuous crystalline polymer component and a discontinuous elastomeric polymer component. That is, the elastomeric polymer component is dispersed within the continuous crystalline polymer component. This is referred to herein as an "elastomeric dispersed" (ED) morphology. See, for example, FIG. 4. Typically, in side-chain crystalline polyacrylates, such as poly(octadecyl acrylate), the ED morphology includes more than about 5 wt-% crystalline polymer component. For the thermomorphic PSA compositions that have about 5 wt-% crystalline polymer component, the morphology can be either ED or CC depending on the crosslink density and the crystallinity.

The amount of crystalline component required to induce the transition between these two morphologies can be influenced by factors such as polar monomer content of the elastomeric polymer component, the temperature at which the elastomeric component polymerizes, and the rate at which this polymerization occurs. Lower concentrations of crystalline component can be used to obtain an "ED" morphology if the elastomeric component formulation contains polar monomers. Although not being bound by theory, it is believed that during the polymerization of the composition, there is a kinetic competition between phase separation of the crystalline component and the building of the elastomeric network. As a result, factors that increase or decrease the rate of the above-mentioned two processes, such as temperature, initiator concentration, and crosslinker content, etc., will affect the final morphology both in scale and shape.

For main chain crystallizable polymer components, such as polyesters, polytetrahydrofuran, lower polyolefins (e.g., $C_2$–$C_3$ olefins), and polyurethanes containing crystalline polyester segments, about 10–30 wt-% is useful in obtaining these desired morphologies.

Typically, as the crystalline content and crosslinking density increases, peel adhesion and tack generally decrease. Higher levels of crosslinking and crystalline component tend to reinforce the adhesive.

Elastomeric Polymer Component

The elastomeric polymer component includes at least one crosslinked polymeric material having pressure sensitive adhesive properties. As used herein, "elastomeric" materials can be described, for example, as amorphous or noncrystalline materials that can be stretched to at least twice their original length and that will retract rapidly and forcibly to substantially (generally at least about 75% of; preferably, at least about 90% of) their original dimensions upon release of the force. The term "crosslinked" refers to a three-dimensional polymeric network formed by the chemical bonds between at least two polymeric chains. This term includes pseudo-crosslinking resulting from ionic bonds or reinforcing physical interactions, for example. Thus, crosslinking can result from a wide variety of interactions, such as covalent bonds, ionic bonds, physical interactions, etc.

Thus, suitable elastomeric materials for use in the elastomeric polymer component are those that can be crosslinked and exhibit pressure sensitive adhesive properties either inherently or by compounding with commonly known tackifying resins. Typically, such crosslinkable pressure sensitive adhesive compositions include tackified natural rubbers, tackified block copolymers (e.g., styrene-isoprene-styrene, styrene-butadiene-styrene, and styrene-ethylene-butene-styrene block copolymers), tackified silicone elastomers, and inherently tacky materials such as poly(acrylates), poly(vinyl esters), and poly(α-olefins).

Poly(acrylates) are a preferred elastomeric material for use in the elastomeric polymer component of the thermomorphic PSAs. These poly(acrylates) are derived from alkyl acrylate and methacrylate monomers, which are specifically monofunctional unsaturated acrylate and methacrylate esters of nontertiary alkyl alcohols, the alkyl groups of which preferably have about 4–11 carbon atoms. Such acrylate monomers, when homopolymerized, generally have glass transition temperatures below about −10° C. Examples of such monomers include, but are not limited to, those selected from the group consisting of isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and mixtures thereof. Preferred poly(acrylates) can be prepared from acrylate monomers including those selected from the group consisting of isooctyl acrylate, isononyl acrylate, isoamyl acrylate, isodecyl acrylate, 2-ethylhexyl acrylate, n-butyl acrylate, sec-butyl acrylate, and mixtures thereof.

Acrylate or methacrylate or other vinyl monomers which, as homopolymers, have glass transition temperatures higher than about −10° C. may optionally be utilized in conjunction with one or more of the acrylate or methacrylate monomers provided that the glass transition temperature of the resultant polymer is below about −10° C. and it has no melting point. Examples of vinyl monomers which, as homopolymers, have glass transition temperatures higher than about −10° C. include, but are not limited to, tert-butyl acrylate, isobornyl acrylate, butyl methacrylate, vinyl acetate, lauryl acrylate, octadecyl acrylate, acrylonitrile, and the like. These monomers can be used in various combinations.

Similarly, free radically copolymerizable polar monomers can also be employed, again provided that the glass transition temperature of the resultant polymer is below about −10° C. Examples of useful polar monomers include, but are not limited to, acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(beta-methacryloxy-ethyl) ammonium propionate betaine, trimethylamine methacrylimide, 1,1-dimethyl-1-(2,3-dihydroxypropyl)amine methacrylimide, N-vinyl pyrrolidone, N-vinyl caprolactam, acrylamide, t-butyl acrylamide, dimethyl amino ethyl acrylamide, N-octyl acrylamide, and the like. These monomers can be used in various combinations. Preferred polar monomers are those selected from the group consisting of monoolefinic monocarboxylic acids, monoolefinic dicarboxylic acids, acrylamides, N-substituted acrylamides, salts thereof, and mixtures thereof. Particularly preferred polar monomers are those selected from the group consisting of acrylic acid, methacrylic acid, N-vinyl pyrrolidone, and mixtures thereof.

Vinyl ester monomers suitable for use in this invention include, but are not limited to, those selected from the group consisting of vinyl 2-ethyl hexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids having about 1–14 carbon atoms which, as homopolymers, have glass transition temperatures below about −10° C. Preferred vinyl ester monomers are those selected from the group consisting of vinyl laurate, vinyl caprate, vinyl-2-ethyl hexanoate, and mixtures thereof.

A variety of methods are available to crosslink the elastomeric materials of the elastomeric polymer component. Crosslinking can be imparted during the elastomeric component polymerization through the use of copolymerizable multifunctional crosslinking agents that are capable of copolymerizing with the elastomeric monomer mixture. The elastomeric component can also be crosslinked following polymerization using other multifunctional crosslinking agents, such as metal ions and peroxides, which are reactive with moieties present on the already-formed polymer chains, or through the use of ionizing radiation, such as electron beams. Whatever crosslinking means are used, crosslinking is done when the primary shape is present.

Preferably, multifunctional crosslinking agents are used, particularly for the preferred acrylate (co)polymers and vinyl ester (co)polymers. The term "multifunctional" as used herein refers to crosslinking agents that possess two or more free radically polymerizable ethylenically unsaturated groups. Suitable multifunctional crosslinking agents include, but are not limited to, polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates. These multifunctional crosslinking agents can be used in a variety of combinations. Preferred multifunctional crosslinking agents are those selected from the group consisting of acrylic or methacrylic esters of diols such as butanediol and hexanediol, triols such as glycerol, tetrols such as pentaerythritol, and mixtures thereof.

When such multifunctional crosslinking agents are used, one or more are used in an amount up to about 0.3 equivalent weight percent, preferably up to about 0.2 equivalent weight percent, more preferably up to about 0.15 equivalent weight percent, and most preferably up to about 0.1 equivalent weight percent, of the total polymerizable composition. Typically, no less than about 0.02 equivalent weight percent, of a multifunctional crosslinker should be present to provide sufficient crosslink density to support the primary shape. The "equivalent weight percent" of a given compound is defined as one hundred times the number of equivalents of that compound divided by the total number of equivalents in the total composition, wherein an equivalent is the number of grams divided by the equivalent weight. The equivalent weight is defined as the molecular weight divided by the number of polymerizable groups in the monomer (in the case of those monomers with only one polymerizable group, equivalent weight is the molecular weight).

Initiators can also be used to enhance the rate of polymerization and/or crosslinking. Suitable free radical initiators include thermally activated initiators such as azo compounds, hydroperoxides, peroxides and the like, and photoinitiators. Photoinitiators can be organic, organometallic, or inorganic compounds, but are most commonly organic in nature. Examples of commonly used organic photoinitiators include benzoin and its derivatives, benzil ketals, acetophenone, acetophenone derivatives, benzophenone, and benzophenone derivatives. The initiator is generally used in an amount ranging from about 0.01 percent up to about 10 percent by weight of the total polymerizable mixture, preferably up to about 5 percent.

Crystalline Polymer Component

The crystalline polymer component includes at least one polymeric material that crystallizes, preferably above room temperature (i.e., 20–25° C.). Such crystallinity, provided by the aggregation of crystallizable moieties present in the backbone (i.e., main chain) or pendant substituents (i.e., side chains) of these components, can be determined by well known crystallographic, calorimetric, or dynamic/mechanical methods. For the purposes of the present invention, this component imparts to the PSA at least one melting or softening temperature ($T_m$) as measured experimentally (for example, by differential scanning calorimetry (DSC)) of greater than about 20° C. Preferably, this component imparts a $T_m$ to the thermomorphic PSA of about 30–100° C. If more than one crystalline material is used in the crystalline polymer component, more than one distinct melting or softening point will be seen. To facilitate preparation, the crystalline materials are typically soluble in organic solvents or in the monomers that form the elastomeric component.

Examples of suitable crystalline polymeric materials having crystallizable main chain or backbone segments include, but are not limited to, polyesters, polytetrahydrofuran, lower polyolefins (e.g., $C_2$–$C_3$ olefins), and polyurethanes containing crystalline polyester segments.

Examples of suitable crystalline polymeric materials having crystallizable pendant moieties (i.e., side chains) include, but are not limited to, poly(acrylate), poly(methacrylate), poly(acrylamide), poly(methacrylamide), poly(vinyl ester) and poly(α-olefin) polymers and copolymers having the following formula:

wherein X is —$CH_2$—, —C(O)O—, —O—C(O)—, and —C(O)—NH—, etc., m is the number of repeating units in the polymer, and n is great enough to provide sufficient side chain length and conformation to form polymers containing crystalline domains or regions at room temperature. The preparation and morphology/conformational properties that determine the crystalline character of such side chain crystallizable or "comb-like" polymers are reviewed by Platé and Shibaev, "Comb-Like Polymers. Structure and Properties," *Journal of Polymer Science—Macromolecular Reviews*, 8, 117–253 (1974), which is incorporated herein by reference.

Preferred crystalline polymeric materials are acrylate or methacrylate polymers derived from acrylate or methacrylate esters of nontertiary higher alkyl alcohols. The alkyl groups of these alcohols contain at least about 12, preferably about 16–26, carbon atoms. Thus, the preferred crystalline polymeric materials of the present invention include poly(dodecyl acrylate), poly(isotridecyl acrylate), poly(n-tetradecyl acrylate), poly(n-hexadecyl acrylate), poly(n-hexadecyl methacrylate), poly(n-octadecyl acrylate), poly(behenyl acrylate), poly(eicosanyl acrylate), and mixtures thereof. Of these, poly(n-octadecyl acrylate), poly(behenyl acrylate), and mixtures or copolymers thereof are preferred. As determined by DSC, poly(octadecyl acrylate) has a melting point in the range of about 42° C. to about 49° C. with an enthalpy of fusion of about 77 Joules/gram and poly(behenyl acrylate) has a melting point in the range of about 62° C. to about 72° C. and an enthalpy of fusion of about 105 Joules/gram. These crystalline polymers are particularly preferred due to their solubility in organic solvents near and above their respective melting temperatures. This facilitates formation of a continuous crystalline component distinct from the elastomeric polymer component.

As long as a copolymer has a melting point, it can include noncrystallizable monomers. Acrylate or methacrylate or other vinyl monomers that are free-radically reactive may optionally be utilized in conjunction with one or more of the side chain crystallizable acrylate and methacrylate monomers provided that the resultant polymer has a melting or softening temperature above room temperature. Examples of such free-radically reactive monomers include, but are not limited to, tert-butyl acrylate, isobornyl acrylate, butyl methacrylate, vinyl acetate, acrylonitrile, styrene, isooctyl acrylate, n-butyl acrylate, 2-ethylhexyl acrylate, and the like. Various combinations of these monomers can be used.

The crystalline polymer component, whether side-chain or backbone crystallizable, may or may not be crosslinked. Preferably, the crystalline polymer component is not crosslinked, at least because preparation is easier.

If it is desirable to crosslink the crystalline polymer component, a variety of methods are available to crosslink the crystalline materials of the crystalline polymer component, as described above for the elastomeric polymer component. For example, ionizing radiation, peroxides, silanes, metal ions, or multifunctional crosslinking agents can be used to chemically crosslink the crystalline materials. Preferably, multifunctional crosslinking agents are used, particularly for the preferred acrylate (co)polymers. Suitable multifunctional crosslinking agents include, but are not limited to, polymeric multifunctional (meth)acrylates, e.g., poly(ethylene oxide) diacrylate or poly(ethylene) oxide dimethacrylate; polyvinylic crosslinking agents, such as substituted and unsubstituted divinylbenzene; and difunctional urethane acrylates. These multifunctional crosslinking agents can be used in a variety of combinations. Preferred multifunctional crosslinking agents are those selected from the group consisting of acrylic or methacrylic esters of diols such as butanediol diacrylate, triols such as glycerol, tetrols such as pentaerythritol, and mixtures thereof.

Also preferred are side chain crystalline polymeric materials derived from higher α-olefin monomers, such as poly(1-decene), poly(1-dodecene), poly(1-tetradecene) and poly(1-hexadecene), and higher vinyl esters, such as vinyl tetradecanoate, vinyl hexadecanoate and vinyl octadecanoate.

Preparation of Pressure Sensitive Adhesives

The thermomorphic pressure sensitive adhesives of the present invention can be synthesized by a variety of sequential methods to form either films or particles. That is, a sequence that involves, for example, forming the crystalline polymer component and then the elastomeric polymer component in the presence of the crystalline polymer component can be used. As a specific example, a free-radical polymerization process (e.g., solution, suspension, emulsion, or bulk polymerization) can be used to form the crystalline component from acrylate or methacrylate monomers. An example of a useful solution polymerization method involving such monomers is described U.S. Pat. No. 4,554,324 (Husman et al.). In this reference, the acrylate or methacrylate monomers are dissolved in a suitable inert organic solvent and polymerized by standard free radical polymerization utilizing a suitable free radical initiator. Suitable free radical initiators that can be used include azo compounds such as 2,2'-azobis (isobutyronitrile), hydroperoxides such as tert-butyl hydroperoxide, peroxides such as benzoyl peroxide or cyclohexanone peroxide. Generally, for preparation of the crystalline component, a free radical polymerization process about 0.01–5 wt-% of such thermally activated initiators are used, based upon the total polymerizable composition.

Subsequently, the already-formed crystalline polymer component can be dissolved in the monomers, initiator, and crosslinking agent used to prepare the elastomeric component at a temperature such that the crystalline component dissolves. For a film, this solution can then be coated onto a backing or siliconized release liner, for example, and subjected to conditions (e.g., thermal or ultraviolet radiation) that polymerize and crosslink the monomers of the elastomeric component. It is during this crosslinking stage that the primary shape is present. The crystalline component can also be crosslinked at this stage of the sequential process, if desired. If a siliconized release liner is used, it can be structured (e.g., microstructured), such as those described in U.S. Pat. No. 5,296,277 (Wilson et al.) and PCT Pat. Appl. No. WO 95/11945 (3M Company), the disclosures of which are incorporated herein by reference, if a nonplanar primary topography is desired.

For particulate PSAs (e.g., microspheres or microparticles), the suspension free radical polymerization methods, such as those described in U.S. Pat. Nos. 3,691,140 (Silver); 4,166,152 (Baker et al.); 4,786,696 (Bohnel); 5,045,569 (Delgado); 5,508,313 (Delgado et al.) and PCT Pat. Appl. No. 96/01280 (3M Company), the disclosures of which are incorporated by reference, can be used with modification. For particulates, suspension polymerizations are typically performed in the presence of a variety of emulsifiers, surfactants, stabilizers and/or under particular process conditions which induce the formation of, and prevent the agglomeration of, the particles (e.g., microspheres having a diameter of about 1–10 micrometers). An example of an adaptation of these processes includes dissolving (or dispersing) the already-formed (crosslinked) crystalline material in the elastomeric component monomer/ crosslinker/initiator mixture at a temperature such that the crystalline polymer component dissolves, followed by formation of an emulsion and subsequent thermal polymerization of the monomer droplets.

The thermomorphic pressure sensitive adhesive compositions of the present invention can include conventional additives such as tackifiers (wood rosin, polyesters, etc.), plasticizers, neutralizing agents, stabilizers, antioxidants, fillers, colorants, and the like. These ingredients are incorporated in amounts that do not materially adversely affect the desired properties of the thermomorphic pressure sensitive adhesives of the present invention.

Preparation of Thermomorphic Pressure Sensitive Adhesive Articles

The thermomorphic pressure sensitive adhesives of the present invention can be processed by a variety of methods to impart a primary and/or a secondary shape (e.g., surface topography) to the adhesive. For example, preferred means for preparing pressure sensitive adhesive films of varying surface topographies are found in PCT Pat. Appl. No. WO 95/11945 (3M Company), which is incorporated herein by reference. For example, to prepare a thermomorphic PSA film having a planar primary shape (i.e., surface topography), a thermomorphic adhesive or polymerizable composition can be coated onto at least a portion of at least one surface of a carrier (e.g., a backing or release liner) prior to polymerization and/or crosslinking of the elastomeric component. Useful coating methods include extrusion, coextrusion, or hot melt techniques, roll coating, knife coating, curtain coating, spray coating, painting, dipping, and the like, which employ conventional coating devices for this purpose. The adhesive layer is then crosslinked and the exposed surface of the adhesive layer is heat embossed using a tool having the desired secondary topography at an embossing temperature above the $T_m$ of the crystalline component. At this elevated temperature, the embossed adhesive layer surface adapts from its planar primary topography to a secondary topography as dictated by the surface topography of the embossing tool. The temperature of the adhesive film is then brought below the $T_m$ of the crystalline component while the secondary topography is present. This could be before or after it is removed from the embossing tool.

Alternatively, in another preferred method for obtaining a thermomorphic PSA film having a structured primary topography, the thermomorphic adhesive or polymerizable composition can be coated onto a release liner or releasable mold that possesses a particular primary topography. This adhesive coating or polymerizable composition is polymerized and/or crosslinked at that time to preserve the primary topography and removed from the liner or tool. The structured adhesive surface is then heat embossed at an embossing temperature above the $T_m$ of the crystalline component as described above with a tool bearing a secondary topography. The thermomorphic adhesive film is then cooled to below the $T_m$ of the crystalline component while the secondary topography is present.

Particulate thermomorphic pressure sensitive adhesive articles can be prepared by coating aqueous suspensions or solvent dispersions of the pressure sensitive adhesive microspheres or microparticles onto suitable carriers by conventional coating techniques, such as knife coating or Meyer bar coating or use of an extrusion die. The primary shape of these particulate adhesives can then be transformed by heat compressing the coated particles at a processing temperature above the $T_m$ of the crystalline component. The resultant secondary shape of the compressed microspheres or microparticles is dependent upon the structure of the surface of the press which contacts the particulate thermomorphic materials. Presses having planar surfaces lead to particles having a flattened appearance, the regularity and symmetry of such appearance dependent on the primary shape of the particle. For example, spherical particles when processed in this manner would be transformed into adhesive materials having a disc-like secondary shape. Should the press have a either a regular or random topography of the same scale as the particles (i.e., grooves, ridges, hemispheres or other geometric or irregular projections or depressions of a micron or submicron magnitude), then the portion or entirety of these thermomorphic particles which contact these shapes, projections, depressions, etc., will conform to these shapes or patterns under the proper compressive and thermal forces.

Carriers used for either film or particulate thermomorphic adhesives may be of a material that is conventionally used as a tape backing or may be of other flexible material. The only requirements are that the carriers have adequate thermal stability so not to be degraded or deformed by the heat embossing process used in some of the methods of the present invention. Such carriers include, but are not limited to, those made from materials selected from the group consisting of poly(propylene), poly(ethylene), poly(vinyl chloride), polyester (e.g., poly(ethylene terephthalate)), polyamide films such as that available from DuPont Co., Wilmington, Del., under the trade designation "KAPTON," cellulose acetate, and ethyl cellulose. Carriers may also be of woven fabric formed from threads of synthetic or natural materials such as cotton, nylon, rayon, glass, or ceramic material, or they may be of nonwoven fabric such as air laid webs of natural or synthetic fibers or blends of these. In addition, the carrier may be formed of materials selected from the group consisting of metal, metalized polymeric film, and ceramic sheet material. Additionally, the thermally-activated, structured backings disclosed in U.S. patent application No. 08/324,333 (Calhoun et al.), which is assigned to 3M Company, St. Paul, Minn., can also be used as backings.

Typically, a structured carrier (e.g., backing or release liner) is made from embossable or moldable materials having sufficient structural integrity to enable them to withstand the process of conveying the structure to the adhesive and be cleanly removed from the structured adhesive film. Preferred such materials include, but are not limited to, plastics such as polyethylene, polypropylene, polyesters, cellulose acetate, poly(vinyl chloride), and poly(vinylidine fluoride), as well as paper or other substrates coated or laminated with such plastics. These embossable coated papers or thermoplastic films are often siliconized or otherwise treated to impart improved release characteristics. One or both sides of the carriers could have such release characteristics.

Advantages of this invention are further illustrated by the following examples. The particular materials and amounts thereof recited in these examples as well as other conditions and details, should not be construed to unduly limit this invention. All materials are commercially available except where stated or otherwise made apparent. All parts and percentages used herein are by weight, unless otherwise specified.

EXAMPLES

Test Methods

Tack

The tack of sheets coated with the pressure sensitive adhesives of the invention was measured with a Polyken Probe Tack tester (available from Kendall Company, Lexington, Mass.) according to American Society for Testing and Materials Test Method ASTM D2979-88. After cleaning the probe with ethyl acetate using a lint-free cloth, a 2 cm×2 cm sample of the adhesive coated sheet was placed on the annular ring weight of the Polyken apparatus. The tack was then measured and recorded using a 10 mm stainless steel probe having a diameter of 0.4975 cm with a speed of 0.5 cm/second and dwell time of 1 second.

Peel Adhesion

Peel adhesion is the force required to remove a coated flexible sheet material from a test substrate measured at a specific angle and rate of removal. In the examples, this force is expressed in Newtons per decimeter (N/dm) width of the coated sheet. The procedure for measuring peel adhesion was as follows: A strip of 0.127 dm in width of the sheet coated with the adhesive was applied to the horizontal surface of a glass substrate with at least 0.127 dm in firm contact. One pass in each direction with a 2 kg hard rubber roller was used to apply the strip. The free end of the coated strip was doubled back nearly touching itself so the angle of removal was about 180°. The free end was then attached to an adhesion tester scale. The test substrate was clamped in the jaws of a tensile testing machine which was capable of moving the substrate away from the scale at a constant rate of 2.3 meters per minute. The dwell time after roll down was 1 minute. The scale reading in Newtons was recorded as the coated strip was peeled from the test substrate surface.

Shear

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel formed an angle of 178° with the extended tape free end, which is then tensioned by application of a force of 1 kg applied as a hanging weight from the free end of the coated strip. The 2° less than 180° was used to negate any peel forces, thereby insuring that only the shear forces were measured in an attempt to more accurately determine the holding power of the tape being tested. The time elapsed for each sample to separate from the test panel was recorded as the shear strength.

Abbreviations

IOA: isooctyl acrylate

AA: acrylic acid

HDDA: 1,6-hexanediol diacrylate 1-4BDA: 1,4-butanediol diacrylate

MAA: methacrylic acid

2-EHA: 2-ethylhexyl acrylate polyODA: poly(octadecyl acrylate)

polyBHA: poly(behenyl acrylate)

$T_m$: melting temperature rpm: revolutions per minute

Example 1

Poly(octadecyl acrylate) was prepared in the following manner: in a 1 liter reaction vessel, 346.68 grams of a 62.3 wt % solution of octadecyl acrylate in ethyl acetate (216 grams octadecyl acrylate) was combined with 0.64 gram of an initiator available under the trade designation "VAZO 64" (N,N'-azobis(isobutyronitrile)) from DuPont and 193.32 grams ethyl acetate. The contents of the reaction vessel were purged with nitrogen for 3 minutes to create an inert atmosphere. The solution was then heated to 55° C. and maintained at that temperature for about 24 hours. As characterized by GPC, the polymerized poly(octadecyl acrylate) product had a number average molecular weight of 99,788.

PolyODA (1.5 grams) was dissolved in a crosslinkable elastomeric pressure sensitive adhesive monomer mixture containing 43.6 grams IOA, 4.85 grams AA, and 0.025 gram 1,6-HDDA, using an infrared lamp to heat the mixture until all components were dissolved. A 2,2-dimethoxy-2-phenylacetophenone photoinitiator commercially available under the trade designation "IRGACURE 651" from Sartomer Co., Exton, Pa. (0.15 gram) was added to the solution of the polymer in the monomer. The solution was coated in a knife coater between a 25 μm thick primed polyethylene terephthalate film and a transparent siliconized film to a thickness of about 100 μm. The coated sample was irradiated with low intensity UV light for 8 minutes (total dose=996 mJ). The coating contained about 3 wt-% polyODA. Its morphology was found to have the crystalline phase co-continuous with the elastomeric phase as determined by the following optical microscopic method: A portion of the PSA sample was viewed at room temperature in an optical microscope with transmitted light, with and without cross-polarizers and the morphology was evident.

Examples 2–16

The PSA adhesive compositions of Examples 2–16 were prepared according to Example 1 in the amounts shown in Table 1. The compositions were each coated onto a substrate for testing according to Example 1. The crosslinker used in Examples 2–12 was HDDA and the photoinitiator was "IRGACURE 651," whereas the crosslinker used in Examples 13–16 was 1,4-BDA and the photoinitiator was "DAROCUR 1173" (a 2-hydroxy-2,2-dimethylacetophenone photoinitiator commercially available from Ciba-Geigy Corp., Ardsley, N.Y.). The morphology was determined according to the method of Example 1 and classified in the following manner: "CC"=crystalline component Co-Continuous with the elastomeric component; and "ED"=crystalline component continuous with the Elastomeric component Dispersed therein.

TABLE 1

| Example | polyODA (g) | IOA (g) | AA (g) | Crosslinker (g) | Photo-initiator (g) | Morphology |
|---|---|---|---|---|---|---|
| 2 | 2.0 | 43.2 | 4.8 | 0.025 | 0.15 | CC |
| 3 | 1.5 | 46.08 | 2.42 | 0.025 | 0.15 | CC |
| 4 | 2.0 | 45.60 | 2.4 | 0.025 | 0.15 | CC |
| 5 | 1.5 | 43.60 | 4.85 | 0.025 | 0.15 | CC |
| 6 | 2.0 | 43.20 | 4.80 | 0.025 | 0.15 | CC |
| 7 | 2.5 | 42.75 | 4.75 | 0.025 | 0.15 | ED |
| 8 | 5.0 | 40.50 | 4.5 | 0.023 | 0.15 | ED |
| 9 | 7.5 | 38.25 | 4.25 | 0.020 | 0.15 | ED |
| 10 | 2.0 | 48.0 | 0 | 0.025 | 0.15 | CC |
| 11 | 2.5 | 47.5 | 0 | 0.025 | 0.15 | CC |
| 12 | 3.0 | 47.0 | 0 | 0.025 | 0.15 | ED |
| 13 | 5.0 | 45 | 0 | 0.005 | 0.05 | ED |
| 14 | 2.5 | 47.5 | 0 | 0.0125 | 0.05 | ED |
| 15 | 2.5 | 47.5 | 0 | 0.025 | 0.05 | ED |
| 16 | 7.5 | 42.5 | 0 | 0.125 | 0.1 | ED |

Figure 4:
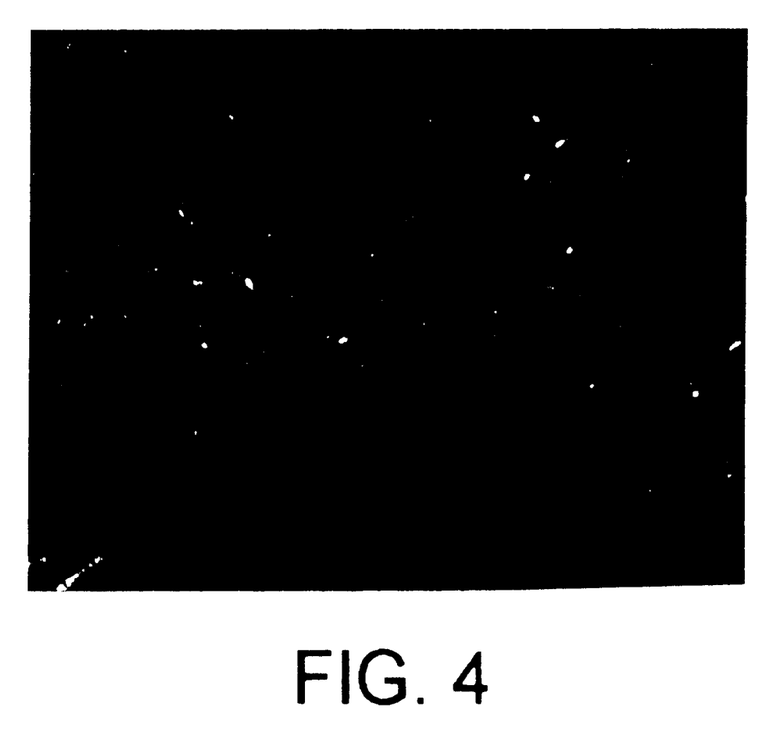
FIG. 4 is an optical micrograph (400 x, viewed between crosspolarizers) of a thermomorphic pressure sensitive adhesive made according to Example 7. Bright regions are the crystalline regions.
Figure 5:
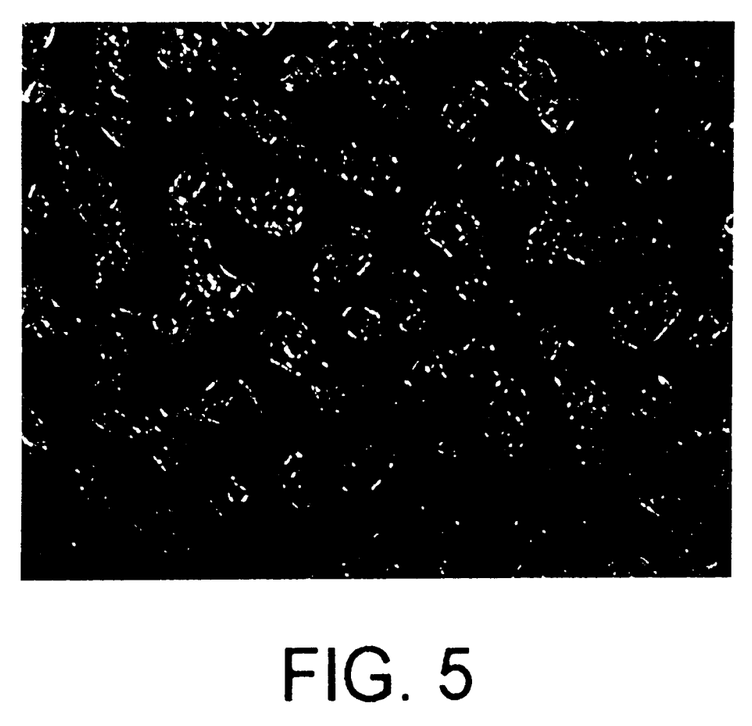
FIG. 5 is an optical micrograph (200 x, viewed between crosspolarizers) of a thermomorphic pressure sensitive adhesive made according to Example 5. Bright regions are the crystalline regions of the co-continuous morphology.
Figure 6:
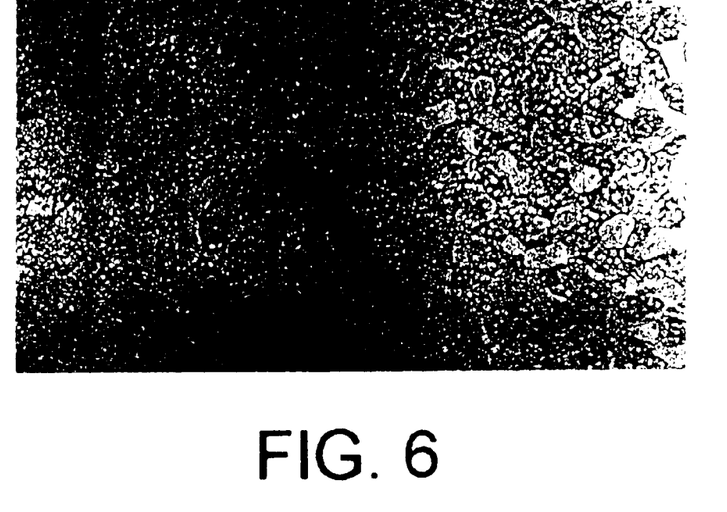
FIG. 6 is an optical micrograph (100 x) of a thermomorphic pressure sensitive adhesive made according to Example 6. Dark regions are the crystalline regions of the co-continuous morphology.

These examples illustrate the effect of the crystalline component content on the morphology of the resultant pressure sensitive adhesives. At about 3–4 wt-% crystalline component (polyODA), co-continuous morphology was observed (Examples 1–6 and 10). At about 5 wt-% crystalline component (polyODA), the elastomeric component tended to be either dispersed within the continuous crystalline phase ("ED") or a co-continuous ("CC") morphology was obtained (Examples 7, 11, 14, and 15). This variability occurred due to polar monomer content (compare the AA content of Example 11 vs. Example 7) and crosslink density (compare the crosslinker content of Example 11 vs. Example 15). At crystalline component level greater than 5 wt-%, a morphology resulted in which the elastomeric component was dispersed within the continuous crystalline component for all examples (Examples 8, 9, 12, 13, and 16). Optical micrographs of Examples 5, 6, and 7 are shown in FIGS. 4–6.

The peel adhesion and tack were determined for Examples 5–9. The results are listed below in Table 2.

TABLE 2

| Example | Thickness (μm) | Peel Adhesion (N/dm) | Tack (g) |
|---|---|---|---|
| 5 | 119 | 84.1 | 1098 |
| 6 | 97 | 84.1 | 984 |
| 7 | 142 | 23.2 | 287 |
| 8 | 140 | 18.8 | 75 |
| 9 | 163 | 2.6 | 38 |

The peel adhesion and tack data in Table 2 illustrate the effect of crystalline component content on the pressure-sensitive adhesive properties of these thermomorphic adhesive compositions. Generally, as the poly(ODA) content increased in these examples, both the tack and peel adhesion decreased.

Comparative Example 1

In this comparative example, a pressure-sensitive adhesive terpolymer comprising 10 weight percent of a crystallizable monomer (octadecyl acrylate) was prepared by the following method: In a glass jar, 5.0 grams of octadecyl acrylate were mixed with 40.5 grams IOA, 4.5 grams AA, 0.025 gram HDDA, and 0.15 gram "IRGACURE 651." The mixture was coated using a knife coater between a 25 μm thick primed PET film and a transparent siliconized film to a thickness of approximately 100 μm. The coated sample was irradiated with low intensity UV light for 8 minutes (total dose=996 mJ). After irradiation, the siliconized film was removed and the sample subjected to tack (699 grams) and peel adhesion (80.6 N/dm) testing as described above. Optical microscopic analysis of the sample showed no morphology or birefringence when viewed between cross-polarizers. DSC revealed no melting point for this composition.

Example 17

A partially polymerized acrylic PSA composition was prepared by dissolving 0.04 wt-% "IRGACURE 651" photoinitiator into a mixture of 90 wt-% IOA and 10 wt-% AA and irradiating the mixture with low intensity UV light until about 10% polymerization was achieved as determined by conventional methods such as gravimetric techniques or gas chromatography, for example. The crystalline material (poly (ODA), 2.5 grams), crosslinker (HDDA, 0.025 gram), and photoinitiator ("IRGACURE 651," 0.15 gram) were added to the partially polymerized mixture (47.5 grams) while agitating and heating until all components were dissolved. The mixture was coated and irradiated for 8 minutes with low intensity UV light as described in Example 1. The resultant pressure sensitive adhesive composition was found to have an ED morphology by microscopic determination.

Examples 18–26

The following examples were prepared in accordance with the procedure described in Example 1 and illustrate the use of alternative elastomeric pressure sensitive adhesive monomer combinations to prepare the PSA compositions of the present invention. Tack, peel adhesion, and shear data for these formulations were obtained and are recorded in Table 3.

release film. The sample was irradiated with low intensity UV light for 8 minutes (total dose—996 mJ). The sample was allowed to cool to room temperature and the release film removed. All samples were tacky to the touch. The sample morphology was observed in an optical microscope with a heating stage.

TABLE 3

| Example | PolyODA (g) | 2-EHA (g) | IOA (g) | AA (g) | MAA (g) | Morphology | Thickness ($\mu$m) | Tack (g) | Peel Adhesion (N/dm) | Shear (min) |
|---|---|---|---|---|---|---|---|---|---|---|
| 18 | 0.6 | 17.64 |  | 1.94 |  | CC | 135 | 575 | 103.3 | 3347 |
| 19 | 0.8 | 17.28 |  | 1.92 |  | CC | 124 | 464 | 53.2 | 2188 |
| 20 | 1.0 | 17.10 |  | 1.90 |  | CC | 137 | 354 | 23.0 | 6046 |
| 21 | 0.6 |  | 17.64 | 1.92 | 0.02 | CC | 132 | 1034 | 105.7 | 3480 |
| 22 | 0.8 |  | 17.28 | 1.90 | 0.02 | CC | 132 | 958 | 104.6 | 1355 |
| 23 | 1.0 |  | 17.10 | 1.88 | 0.02 | CC | 142 | 1236 | 11.4 | 4993 |
| 24 | 0.6 |  | 19.21 |  | 0.194 | CC | 122 | 716 | 89.8 | NT |
| 25 | 0.8 |  | 19.00 |  | 0.192 | CC | 130 | 643 | 100.0 | NT |
| 26 | 1.0 |  | 18.81 |  | 0.190 | CC | 137 | 676 | 87.8 | NT |

NT = Not Tested

Examples 18–26 demonstrate the ability to formulate pressure-sensitive adhesives having a range of properties depending on the amounts and types of acrylate monomers, polar monomers and crystalline components employed.

Examples 27–29

These examples illustrate the use of poly(behenyl acrylate) as the crystalline component. The PSAs were prepared by dissolving the polyBHA in the monomer mixtures shown below at a temperature above the $T_m$ of the polyBHA with agitation. "IRGACURE 651" photoinitiator was added to the solutions. A glass slide was placed in a heating plate heated to 68° C. Two drops of each solution were placed on the glass slide and covered with a transparent siliconized release film. The samples were irradiated with low intensity UV light for 8 minutes (total dose=996 mJ) while on the heating plate. Afterwards the sample was removed from the heating plate and allowed to cool to room temperature. The transparent release film was removed and the sample observed under an optical microscope to determine their morphology. The results of this morphology determination are recorded in Table 4. All samples we tacky to the touch.

TABLE 4

| Example | polyBHA (g) | IOA (g) | AA (g) | HDDA (g) | "Irgacure 651" (g) | Morphology |
|---|---|---|---|---|---|---|
| 27 | 2.0 | 43.2 | 4.84 | 0.025 | 0.15 | CC |
| 28 | 2.5 | 42.75 | 4.75 | 0.025 | 0.15 | CC |
| 29 | 3.0 | 42.3 | 4.70 | 0.025 | 0.15 | ED |

Examples 30–35

These examples illustrate the use of a mixture of two different crystalline materials in the preparation of the PSA compositions. A monomer mixture containing 135 grams IOA, 15 grams AA, 0.075 gram 1,6-HDDA and 0.45 gram "IRGACURE 651" photoinitiator was prepared by mixing these ingredients in a glass jar. Different amounts of poly-BHA and polyODA were dissolved with agitation and heat in different amounts of the monomer mixture as indicated below in Table 5. Several drops of each one of the solutions in the examples were put on a glass slide on a hot plate heated to 72° C. and covered with a transparent siliconized

TABLE 5

| Example | polyBHA (g) | polyODA (g) | IOA/AA/HDDA/ "Irgacure 651" mixture (g) | Morphology |
|---|---|---|---|---|
| 30 | 0.20 | 0.20 | 9.6 | CC |
| 31 | 0.25 | 0.25 | 9.5 | CC |
| 32 | 0.30 | 0.30 | 9.4 | ED |
| 33 | 0.10 | 0.30 | 9.6 | CC |
| 34 | 0.125 | 0.375 | 9.5 | CC |
| 35 | 0.15 | 0.45 | 9.4 | ED |

In Examples 30–35, two different melting points were detected, one corresponding to the polyODA component at about 52° C. and another derived from the polyBHA contribution at about 72° C.

Examples 36–39

The following examples illustrate the use of main chain crystalline materials for the preparation of the adhesive compositions. These examples use a saturated polyester diol commercially available from Ruco Polymer Corp., Hicksville, N.Y., under the trade designation "RUCOFLEX S105-55," which has a $T_m$ of 55–65° C. and a molecular weight of 2000. All compositions were prepared in the proportions listed in Table 6 according to the method of Example 1 using 0.3 wt-% "IRGACURE 651" photoinitiator and 0.05 wt-% 1,4-BDA crosslinker.

TABLE 6

| Example | "Rucoflex S105-55" (g) | IOA (g) | AA (g) | Morphology | Thickness ($\mu$m) | Peel Adhesion (N/dm) | Tack (g) | Shear (min) |
|---|---|---|---|---|---|---|---|---|
| 36 | 1.2 | 7.92 | 0.88 | CC | 109 | — | 528 | — |
| 37 | 1.5 | 7.65 | 0.85 | CC | 145 | 151.0 | 384 | 1370 |
| 38 | 2.0 | 7.2 | 0.80 | CC | 142 | 148.9 | 313 | 278 |
| 39 | 2.2 | 7.02 | 0.78 | CC | 74 | — | 419 | — |

Examples 40–43

The following examples illustrate the use of an alternative saturated polyester diol as the main chain crystalline material for the preparation of the adhesive compositions. These examples use a saturated polyester diol commercially available from Ruco Polymer Corp., Hicksville, N.Y., under the trade designation "RUCOFLEX S1019-35," which has a $T_m$ of 40–50° C. and a molecular weight of 3200. All compositions were prepared in the proportions expressed in Table 7 according to the method of Example 1 using 0.3 wt-% "IRGACURE 651" photoinitiator and 0.05 wt-% 1,4-BDA crosslinker.

TABLE 7

| Example | "Rucoflex S1019-35" (g) | IOA (g) | AA (g) | Morphology | Thickness (μm) | Peel Adhesion (N/dm) | Tack (g) | Shear (min) |
|---|---|---|---|---|---|---|---|---|
| 40 | 1.2 | 7.92 | 0.88 | CC | 38 | — | 272 | — |
| 41 | 1.5 | 7.65 | 0.85 | CC | 117 | 125.2 | 811 | 1254 |
| 42 | 2.0 | 7.20 | 0.80 | CC | 119 | 140.7 | 1357 | 128 |
| 43 | 2.2 | 7.02 | 0.78 | CC | 48 | — | 590 | — |

Examples 44–47

The following examples illustrate the use of a polyether main chain crystalline material for the preparation of the adhesive compositions. These examples use a polytetrahydrofuran-polyether commercially available from DuPont Co., Wilmington, Del., under the trade designation "TERATHANE 2000," which has a $T_m$ of 28–60° C. and a molecular weight of about 1900–2100. All compositions were prepared in the proportions expressed in Table 8 according to the method of Example 1 using 0.3 wt-% "IRGACURE 651" photoinitiator and 0.05 wt-% 1,4-butanediol diacrylate crosslinker.

TABLE 8

| Example | Terathane (g) | IOA (g) | AA (g) | Morphology | Thickness (μm) | Tack (g) |
|---|---|---|---|---|---|---|
| 44 | 2.0 | 7.20 | 0.80 | CC | 135 | 833 |
| 45 | 2.2 | 7.02 | 0.78 | CC | 140 | 519 |
| 46 | 2.5 | 6.75 | 0.75 | CC | 107 | 802 |
| 47 | 3.0 | 6.30 | 0.70 | ED | 53 | 318 |

Examples 48–51

The following examples illustrate the use of a crystalline polyurethane ($T_m$ of 47° C.) prepared from a polyester diol (70:30 hexanediol adipate/neopentyl glycol) and isophorone diisocyanate in a 1.3:1 OH:NCO ratio. All compositions were prepared in the proportions expressed in Table 9 according to the method of Example 1 using 0.3 wt-% "IRGACURE 651" photoinitiator and 0.05 wt-% 1,4-BDA crosslinker. Several drops of each example were put on a glass slide on a heated plate and covered with a transparent siliconized release film and irradiated while heated with low intensity UV light for 8 minutes (996 mJ). The samples were allowed to cool to room temperature and tested for tack.

TABLE 9

| Example | Polyurethane (g) | IOA (g) | AA (g) | Morphology | Thickness (μm) | Tack (g) |
|---|---|---|---|---|---|---|
| 48 | 1.5 | 7.65 | 0.85 | CC | 41 | 356 |
| 49 | 2.0 | 7.2 | 0.80 | CC | 43 | 513 |
| 50 | 2.5 | 6.75 | 0.75 | CC | 38 | 253 |
| 51 | 3.0 | 6.3 | 0.70 | ED | 173 | 797 |

Examples 52–53

The following examples illustrate the use of a crystalline polyester (90:10, 1,4-butanediol:neopentyl glycol)/adipic acid with 1.2/1 OH/COOH ratio ($T_m$ of 42° C.). All compositions were prepared in the proportions expressed in Table 10 according to the method of Example 1 using 0.3 wt-% "IRGACURE 651" photoinitiator and 0.05 wt-% 1,4-BDA crosslinker. Several drops of each example were put on a glass slide on a heated plate and covered with a transparent siliconized release film and irradiated while heated with low intensity UV light for 8 minutes (996 mJ). The samples were cooled to room temperature and tested for tack, peel adhesion, and shear.

TABLE 10

| Example | Polyester (g) | IOA (g) | AA (g) | Morphology | Thickness (μm) | Tack (g) | Peel Adhesion (N/dm) | Shear (min) |
|---|---|---|---|---|---|---|---|---|
| 52 | 1.4 | 3.24 | 0.36 | CC | 109 | 434 | — | — |
| 53 | 3.0 | 6.3 | 0.70 | CC | 122 | 616 | 75.1 | 44 |

Examples 54–62

The following examples illustrate the use of three different saturated crystalline polyesters available from Huls America Inc., Piscataway, N.J., under the trade designations "DYNAPOL S1401" (Examples 54–57), "DYNAPOL S1402" (Examples 58–60), and "DYNAPOL S1359" (Examples 61–62). All compositions were prepared in the proportions expressed in Table 11 according to the method of Example 1 using 0.3 wt-% "IRGACURE 651" photoinitiator and 0.05 wt-% 1,4-BDA crosslinker. Several drops of each example were put on a glass slide on a heated plate and covered with a transparent siliconized release film and irradiated while heated with low intensity UV light for 8 minutes (996 mJ). The samples were cooled to room temperature and tested for tack, peel adhesion, and shear.

TABLE 11

| Example | "Dynapol" (g) | IOA (g) | AA (g) | Morphology | Thickness (μm) | Tack (g) |
|---|---|---|---|---|---|---|
| 54 | 1.5 | 7.65 | 0.85 | CC | 125 | 609 |
| 55 | 1.7 | 7.47 | 0.83 | CC | 113 | 329 |
| 56 | 2.0 | 7.20 | 0.80 | ED | 138 | 544 |
| 57 | 2.5 | 6.75 | 0.75 | ED | 125 | 830 |
| 58 | 1.5 | 7.65 | 0.85 | CC | 158 | 1147 |
| 59 | 1.7 | 7.47 | 0.83 | ED | 30 | 367 |
| 60 | 2.0 | 7.20 | 0.80 | ED | 43 | 318 |
| 61 | 1.5 | 7.65 | 0.85 | CC | 133 | 184 |
| 62 | 2.0 | 7.20 | 0.80 | CC | 155 | 587 |

All of Examples 36–62 contain crystalline components derived from a range of classes of main chain crystalline polymers. In general, high concentrations of these main chain crystalline materials (anywhere from 12–30 wt-%) can be used to form thermomorphic compositions having co-continuous ("CC") morphologies.

The following examples illustrate the thermomorphic behavior of particulate (Examples 63–65) and film (Examples 66–72) compositions of the present invention.

Example 63

This example illustrates the preparation of a PSA composition in the form of microspheres by a suspension polymerization method. In a one liter glass reactor equipped with a mechanical stirrer, thermometer and inlet-outlet lines for vacuum and argon, 7.5 grams of an aqueous solution of polyacrylic acid at 20 wt-% solids was dispersed in 450 grams of deionized water and neutralized with ammonium hydroxide to a pH of 7. Subsequently, 6.0 grams ammonium lauryl sulfate, obtained from Henkel AG, Dusseldorf, Germany, under the trade designation "STANDAPOL A," were added to the reactor. The reactor was heated to 65° C. while stirring at 600 revolutions per minute (rpm). In a glass jar, 7.5 grams polyODA were dissolved in 142.50 grams IOA and 0.04 gram 1,4-BDA with heating. After the polyODA was dissolved, 0.67 gram benzoyl peroxide, obtained from Elf Atochem North America Philadelphia, Pa. under the trade designation "LUCIDOL 70," was dissolved in the monomer-polymer solution. When the contents of the reactor reached 65° C., the solution of polyODA in the monomers containing the initiator was added while keeping the rate of agitation at 600 rpm. After 15 hours at 65° C., the contents of the reactor were allowed to cool to room temperature.

Several drops of the microsphere suspension were dried on a glass slide. The microspheres were tacky to the touch. Optical microscopy showed microspheres with an average diameter of about 40 $\mu$m. The microspheres on the glass slide were covered with another glass slide and a 1 kg weight was placed on top of the second glass slide. The specimen was put in an oven for 5 minutes at 60° C. and then removed from the oven and allowed cool to room temperature while keeping the 1 kg weight on top. After cooling to room temperature, the microspheres were viewed in an optical microscope. It was observed that the microspheres had been flattened to a disk shape. The flattened microspheres were put in the oven at 60° C. for 5 minutes, removed, allowed to cool to room temperature, and observed again in the optical microscope. It was observed that the microspheres had recovered their spherical shape.

Examples 64–65

The following examples were prepared according to the procedure described in Example 63 with the amounts of crystalline material, monomers, and initiator shown below in Table 12. Both examples exhibited the same thermomorphic behavior as demonstrated by Example 63.

TABLE 12

| Example | PolyODA (g) | IOA (g) | 1,4-BDA (g) | "Lucidol 70" (g) |
|---|---|---|---|---|
| 64 | 15 | 135 | 0.04 | 0.64 |
| 65 | 22.5 | 127.5 | 0.04 | 0.60 |

Preparation of Polysiloxane Structured Molding Tools

Polysiloxane molding tools used to impart structured primary and secondary topographies to the thermomorphic pressure-sensitive adhesive compositions and articles of the present invention were prepared according to the methods of PCT Appl. WO 95/11945 in the following manner: Diamino functional polysiloxanes terminated on both ends with ethylenically unsaturated groups (i.e., acrylamidoamido siloxanes—"ACMAS") having molecular weights of 10,000 (10K ACMAS) and 35,000 (35K ACMAS) were prepared by the method described in U.S. Pat. No. 5,091,483 (Mazurek et al.), incorporated herein by reference. A blend of 5.0 grams 10K ACMAS and 5.0 grams 35K ACMAS were mixed with 0.02 gram of a 2-hydroxy-2-methyl-1-phenyl-propan-1-one photoinitiator commercially available from EM Industries under the tradename "DAROCUR 1173" and the mixture was coated to a thickness of 2 mm against a structured master. After covering the non-structured surface of the polysiloxane coating with a polyester film, the mixture was then exposed to UV radiation at 2.6 mW/cm$^2$ (Sylvania Blacklight) for 10 minutes and the cured polysiloxane molding tool was removed from the structured master. Structured masters used in the examples include contiguous V-shaped grooves having a depth of 50 $\mu$m and a base width of 100 $\mu$m and contiguous positive cube corners (i.e., projecting out of the master surface) having an average height of approximately 62.5 $\mu$m and a base width of approximately 125 $\mu$m prepared according to the methods of PCT Pat. Appl. No. WO 95/11945, incorporated herein by reference. Replication of the positive cube corner master yielded a polysiloxane molding tool having contiguous negative cube corners (i.e., projecting into the molding tool surface).

Embossed release liners were also used in imparting structured surfaces to the thermomorphic adhesives of the present invention. These release liners were prepared from polyethylene coated papers having a thickness of about 75 $\mu$m coated with commercial silicone release coatings and embossed using thermal methods such as those described in U.S. Pat. No. 3,301,741, incorporated herein by reference. The embossed features were substantially cylindrical in shape, approximately 40–50 $\mu$m in depth, and spaced symmetrically at 40 lines per inch (1600 features/in$^2$) and 65 lines per inch (4225 features/in$^2$). Such embossed release liners are described in U.S. Pat. No. 5,296,277 (Wilson et al.).

Example 66

The thermomorphic pressure-sensitive adhesive polymerization mixture of Example 16 (2.5 grams poly(ODA) dissolved in 47.5 grams IOA, 0.125 gram 1,4-BDA, 0.01 gram "DAROCUR 1173" photoinitiator) was prepared. The mixture containing photoinitiator was coated onto the V-grooved polysiloxane molding tool and the open surface of the adhesive covered with a primed polyester film. This layered composite was then irradiated with low intensity UV light for 7 minutes (total dose=805 mJ) and the cured adhesive composition as bonded to the primed PET film was removed from the molding tool. When examined with an optical microscope, the V-groove pattern was found to be replicated onto the adhesive surface and this pattern became the adhesive coating's primary topography. The structured adhesive layer was then given a planar secondary topography by covering the structured surface of the adhesive with a siliconized paper release liner and compressing the covered article using a GBC laminator at a temperature of 80° C. Removal of the release liner revealed the disappearance of the primary V-groove pattern, replaced by a planar secondary topography having minor irregularities due to the impressions left by the release paper fibers. The planar adhesive article was then placed in an oven set at a temperature greater than the T$_m$ of the poly(ODA) component of the adhesive (75° C. oven temperature) for 5 minutes. Following heating, microscopic analysis revealed that the primary V-groove topography returned to the adhesive surface with a very high degree of fidelity.

Examples 67 and 68

Figure 1:
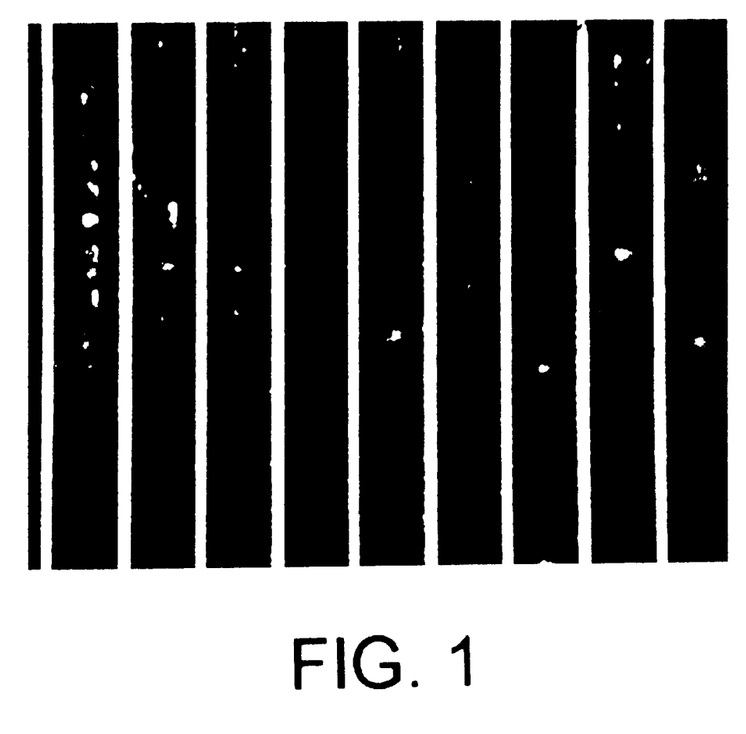
FIG. 1 is a photograph of the top view of a thermomorphic pressure sensitive adhesive in its primary shape prior to the application of heat made according to Example 68.
Figure 2:
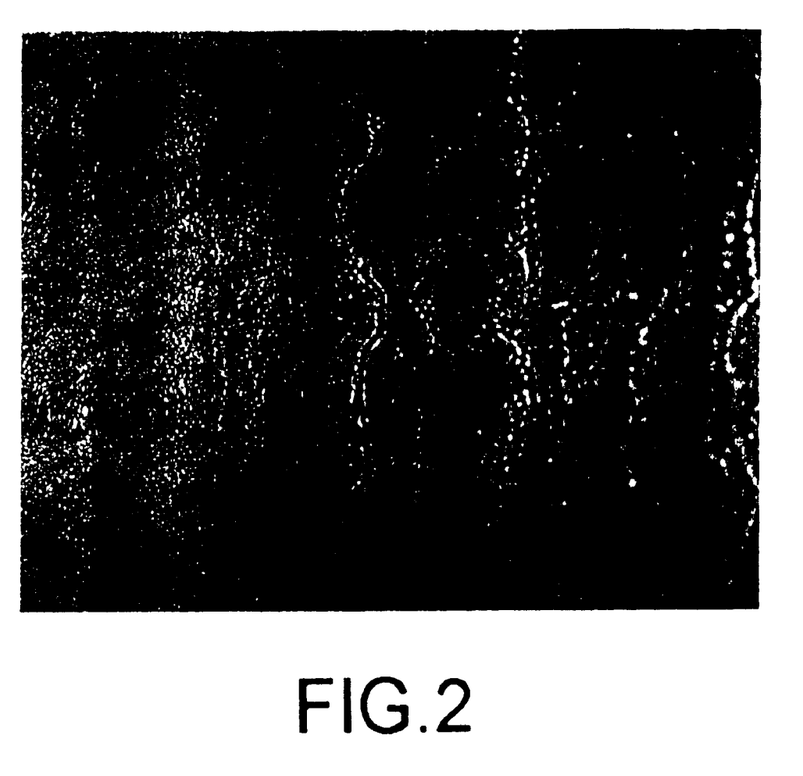
FIG. 2 is a photograph of the top view of the thermomorphic pressure sensitive adhesive shown in FIG. 1 in its secondary shape prior to the application of heat.
Figure 3:
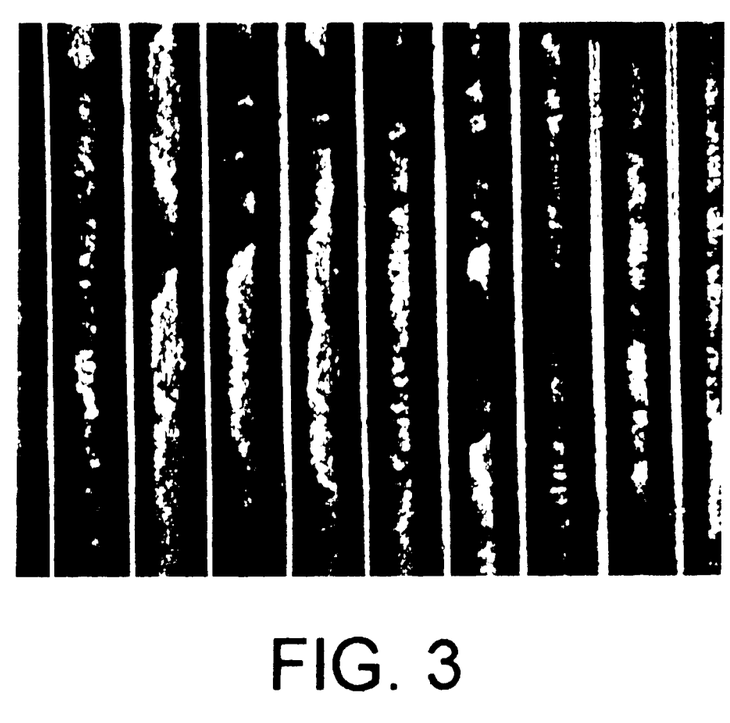
FIG. 3 is a photograph of the top view of a thermomorphic pressure sensitive adhesive shown in FIGS. 1 and 2 in its primary shape after the application of heat to the secondary shape shown in FIG. 3.

Thermomorphic adhesive articles having V-grooved primary and planar secondary topographies were prepared according to the method of Example 66 using the adhesive formulations of Example 13 (5.0 grams poly(ODA) dissolved in 45.0 grams IOA, 0.005 gram 1,4-BDA, 0.05 gram "DAROCUR 1173") and Example 15 (2.5 grams poly (ODA) dissolved in 47.5 grams IOA, 0.025 gram 1,4-BDA, 0.05 gram "DAROCUR 1173"). Both demonstrated thermomorphic behavior (i.e., the primary V-grooved surface was regained) when subjected to the coating, structuring, compressing, and heating cycle described in Example 66. FIGS. 1–3 demonstrate this for Example 68.

Example 69

A thermomorphic adhesive article was prepared according to the method of Example 66, except the previously described negative cube corner polysiloxane molding tool was used instead of the V-groove mold. This alternatively structured adhesive demonstrated thermomorphic behavior (i.e., the primary V-grooved surface was regained) when subjected to the coating, structuring, compressing, and heating cycle described in Example 66.

Examples 70 and 71

Thermomorphic adhesive samples having the compositions of Examples 3 and 4 having planar primary topographies were prepared and covered with the 40 lines per inch release liner described above with the positive cylindrical projections of this liner contacting the adhesive surface. The covered article was embossed using a GBC laminator at a temperature of 85° C., forming adhesive surfaces having cylindrical depressions as the secondary topography. After embossing, a piece of each sample was cut and place in an oven at a temperature greater than the $T_m$ of the poly(ODA) component of the adhesives (70° C.) for 5 minutes. In both cases, the surface of the adhesives reverted to their planar primary topographies.

Example 72

An example of a thermomorphic PSA delivery system was prepared using a thermomorphic PSA sample having the same composition as Example 4. The sample was covered with the 65 lines per inch release liner described above with the positive cylindrical projections of the liner contacting the adhesive surface. The covered article was compressed using a 2.5 kg weight at a temperature of 80° C. for 15 minutes, forming an adhesive surface having cylindrical depressions as its secondary topography. After compressing, the release liner was removed and ink (blue cartridge ink available under the trade designation "SKRIP" from Schaefer) was wiped onto the embossed adhesive surface. When dried, the ink filled the cylindrical depressions of the sample. The sample was then cut and placed in an oven at a temperature greater than the $T_m$ of the poly(ODA) component of the adhesive (80° C. oven temperature) for 3 minutes. Following heating, the surface of the adhesive reverted to its planar primary topography, and the ink was released from the cavities in a pattern replicating the secondary topography of the thermomorphic PSA.

The disclosures of all patents and publications cited herein are incorporated by reference. While this invention has been described in connection with specific embodiments, it should be understood that it is capable of further modification. The claims herein are intended to cover those variations which one skilled in the art would recognize as the chemical equivalent of what has been described herein. Thus, various omissions, modifications, and changes to the principles described herein may be made by one skilled in the art without departing from the true scope and spirit of the invention which is indicated by the following claims.

What is claimed is:

1. A thermomorphic pressure sensitive adhesive article comprising a carrier having at least a portion of at least one surface on which is coated a layer of a thermomorphic pressure sensitive adhesive comprising:
   (a) a continuous crystalline polymer component having a melting temperature of greater than about 20 degrees C.; and
   (b) a discrete crosslinked elastomeric polymer component having a glass transition temperature of less than about 20 degrees C.;
   wherein the pressure sensitive adhesive has at least one distinct crystalline melting point and is capable of transitioning between a secondary topography and a primary predetermined topography upon an increase in temperature, and further wherein the pressure sensitive adhesive is tacky to the touch at room temperature.

2. The thermomorphic pressure sensitive adhesive article of claim 1 wherein the primary topography is generally planar and the secondary topography is structured.

3. The thermomorphic pressure sensitive adhesive article of claim 2 wherein the structured secondary topography comprises recessed cavities.

4. The thermomorphic pressure sensitive adhesive article of claim 3 wherein the recessed cavities include a material therein for delivery to a surface to which the article is adhered.

5. The thermomorphic pressure sensitive adhesive article of claim 4 wherein the material is selected from the group consisting of a pharmaceutical, a pigment, and an ink.

6. The thermomorphic pressure sensitive adhesive article of claim 2 which is a positionable pressure sensitive adhesive article.

7. The thermomorphic pressure sensitive adhesive article of claim 1 wherein the carrier is a release liner.

* * * * *